(12) United States Patent
Lee

(10) Patent No.: US 7,972,693 B2
(45) Date of Patent: Jul. 5, 2011

(54) ENAMEL VARNISH COMPOSITION FOR ENAMEL WIRE AND ENAMEL WIRE USING THE SAME

(75) Inventor: Joon-Hee Lee, Gunpo-si (KR)

(73) Assignee: LS Cable Ltd., Anyang (KR)

( * ) Notice: Subject to any disclaimer, the term of this patent is extended or adjusted under 35 U.S.C. 154(b) by 948 days.

(21) Appl. No.: 11/816,785

(22) PCT Filed: May 27, 2005

(86) PCT No.: PCT/KR2005/001573
§ 371 (c)(1),
(2), (4) Date: Aug. 21, 2007

(87) PCT Pub. No.: WO2006/088272
PCT Pub. Date: Aug. 24, 2006

(65) Prior Publication Data
US 2008/0176072 A1    Jul. 24, 2008

(30) Foreign Application Priority Data
Feb. 21, 2005  (KR) ........................ 10-2005-0014282

(51) Int. Cl.
*B32B 15/00*  (2006.01)
*C08G 73/14*  (2006.01)
*C08F 126/06* (2006.01)

(52) U.S. Cl. ........ 428/375; 528/322; 528/125; 528/126; 528/128; 528/170; 526/259; 526/261; 526/262

(58) Field of Classification Search .................. 525/420, 525/424; 528/45, 48, 51; 428/375
See application file for complete search history.

(56) References Cited

U.S. PATENT DOCUMENTS

| | | | |
|---|---|---|---|
| 4,374,221 A | | 2/1983 | McGregor et al. |
| 5,216,117 A | * | 6/1993 | Sheppard et al. ............. 528/322 |
| 5,219,657 A | * | 6/1993 | Ueoka et al. ................... 428/379 |
| 6,355,357 B1 | | 3/2002 | Takahashi et al. |
| 7,122,244 B2 | | 10/2006 | Konig et al. |
| 2004/0006174 A1 | | 1/2004 | Todter Konig et al. |

FOREIGN PATENT DOCUMENTS

| | | |
|---|---|---|
| CN | 1258187 | 6/2000 |
| CN | 1449424 | 10/2003 |
| JP | 7-238138 | 9/1995 |
| KR | 2003-50837 | 6/2003 |

OTHER PUBLICATIONS

International Search Report, dated Nov. 25, 2005, in International patent appln. No. PCT/KR2005/001573.

* cited by examiner

*Primary Examiner* — D. Lawrence Tarazano
*Assistant Examiner* — Ricardo E Lopez
(74) *Attorney, Agent, or Firm* — NSIP Law, PC

(57) ABSTRACT

Disclosed are enamel varnish compositions for an enamel wire and an enamel wire using the same. The present invention relates to enamel varnish compositions for an enamel wire in which a polymeric resin component is included in an organic solvent, wherein the polymeric resin component includes a first polyamideimide resin, presented in the Chemistry FIG. 1; and a second resin having polyamideimide in which a triazine ring is introduced into a major chain. The enamel wire, in which such a coating pigment composition is applied to the innermost insulated coating layer contacted with the conducting wire, shows the increased adhesivity of the insulated coating layer to the conducting wire without forming an additional bonding layer, as well as the excellent physical properties such as the wear resistance and flexibility, etc.

5 Claims, No Drawings

ENAMEL VARNISH COMPOSITION FOR ENAMEL WIRE AND ENAMEL WIRE USING THE SAME

CROSS-REFERENCE TO RELATED APPLICATIONS

This application is a is a national stage application under 35 U.S.C. 371 based on and claiming the benefit of International Application Serial No. PCT/KR2005/001573 filed on May 27, 2005 which claims the benefit of priority from Korean Application No. 10-2005-0014282 filed on Feb. 21, 2005, the entire contents of both of which are incorporated herein by reference.

TECHNICAL FIELD

The following description relates to enamel varnish composition for enamel wire and an enamel wire using the same.

BACKGROUND ART

Generally, an enamel wire, which is an insulated wire, is wound in a coiled form in the inside of an electric apparatus, and functions to interconvert electrical energy and mechanical energy by means of a conversion process of magnetic energy. Such an enamel wire is generally composed of a conducting wire such as copper, etc. and an insulated coating layer surrounding the conducting wire, and it is manufactured by applying pigment, generally composed of organic solvent and polymeric resin, to a surface of a conductor, drying and cross-linking it at a high temperature of more than 400° C. to form a thin insulated coating layer. Here, the coating pigment is present in the state that the polymeric resin components are dissolved and dispersed in the organic solvent.

Such an enamel wire has been recently used in various fields such as heavy electric apparatuses, automotive parts, household appliances, medical appliances, and core materials in the aerospace industries, etc.

Recently, there has been required a small and light motor with high performance as the electric and electronic apparatuses increasingly tend toward their miniaturizaion and lightweightness. Accordingly, the winding number of the enamel wire wound around a motor core should be necessarily increased with trends of such miniaturizaion and lightweightness. Also, as the winding number of the enamel wire becomes increased and a size of the motor becomes smaller, an unreasonable process has been carried out, for example to forcibly fit the enamel wire into a core slot. As a result, there often appears a problem that the coating layer of the enamel wire is easily damaged.

Also, as a winding speed is further increased in order to improve productivity using winding machines, tensions and impacts inflicted on the enamel wire are also increased upon its winding, resulting in an increased damage of the insulated coating layer.

Such a damage of the insulated coating layer has a problem that it is a major cause of the poor inherent characteristics of the winding and also the deteriorated reliability of the motor.

In order to solve the problems, there have been attempts to give a lubricating ability to the insulated coating, mainly by adding an organic or inorganic lubricant to a coating pigment, or by directly applying a lubricant oil, etc. onto the enamel wire. However, the aforementioned problems were not fundamentally solved even in such a method.

As an alternative, mechanical strength of the insulated coating of the enamel wire was further increased so as to solve the problems, but simple increase of the mechanical strength allows the coating to be more rigid and less flexible. Accordingly, there are problems that the coating layer is easily cracked and peeled off and properties of the enamel wire are deteriorated when the enamel wire is bent.

In particular, a polyamideimide-based resin, widely used as the coating material of the enamel wire, has excellent physical properties, but it has a disadvantage of having poor adhesivity to a conductor, resulting in deterioration of flexibility and wear resistance of the enamel wire.

In order to solve the problems, various methods have been suggested to increase adhesivity of the polyamideimide-based resin to a conductor, for example by adding alkoxy-modified resin and benzotriazole to a polyamideimide resin solution (Japanese Laid-open Publication No. H3-37283); trialkylamine to a polyamideimide resin solution (Japanese Laid-open Publication No. H6-111632); or melamine resin to a polyamideimide resin solution (Japanese Laid-open Publication No. H10-334735).

However, these kinds of the compositions have problems that their solubility or compatibility is insufficient, or their storage stability is deteriorated since other additives reacts with unreacted terminal groups of the polyamideimide resin, etc.

Also, an additional process such as an undercoating, in which a separate bonding layer is formed between a conducting wire and another coating layer, was required in the prior art to improve an adhesive force between a coating layer and a conducting wire.

DISCLOSURE OF INVENTION

Technical Problem

Accordingly, the following description is designed to solve the problems of the prior art, and therefore it is a general aspect of the following description to provide polyamideimide-based enamel varnish composition for enamel wire in which an additional undercoating process is not required since the enamel varnish composition for enamel wire has an excellent adhesivity to a conducting wire, as well as an excellent wear resistance.

Also, it is another general aspect of the following description to provide an enamel wire having an improved adhesivity of an insulated coating layer to a conducting wire, as well as excellent properties such as wear resistance, flexibility, etc. using the enamel varnish composition for enamel wire as described above.

Technical Solution

In one general aspect a polyamideimide-based enamel varnish composition for enamel wire having polymeric resin components in organic solvent is provided, wherein the polymeric resin component includes a first polyamideimide resin, presented in following Chemistry FIG. 1; and a second polyamideimide resin in which a triazine ring having an imidazole group in a side chain is introduced into a major chain:

ChemistryFigure 1

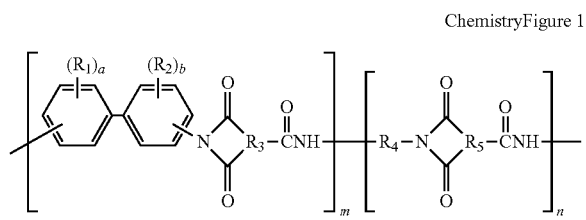

Reaction Formula 1

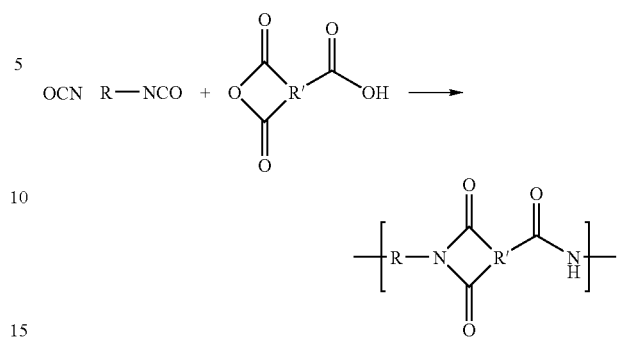

In the Chemistry FIG. 1, ratio of m:n ranges from 0.1:0.9 to 0.9:0.1, $R_1$ and $R_2$ each is independently selected from the group consisting of alkyl group, alkoxy group and halogen, the alkyl group and the alkoxy group having 1 to 4 carbon atoms, a and b each is an integer of 0 to 4, $R_3$ and $R_5$ each is independently a residue derived from at least one acid compound selected from the group consisting of trimelitic acid, trimelitic dianhydride, trimelityl chloride or derivatives of the trimelitic acid, and $R_4$ is a residue derived from at least one aromatic diisocyanate compound selected from the group consisting of diphenylmethane-4,4'-diisocyanate, diphenylmethane-3,3'-diisocyanate, diphenylmethane-3,4'-diisocyanate, diphenylether-4,4'-diisocyanate, benzophenone-4,4'-diisocyanate, diphenylsulfone-4,4'-diisocyanate, tolylene-2,4-diisocyanate, tolylene-2,6-diisocyanate, m-xylene diisocyanate and p-xylenediisocyanate.

Also, in another general aspect, an enamel wire having a conducting wire; and a plurality of insulated coating layers formed in the outside of the conducting wire is provided, wherein the enamel wire includes an adhesive coating layer including, as the innermost insulated coating layer directly connected to an outer surface of the conducting wire, a first polyamideimide resin; and a second polyamideimide resin in which a triazine ring having an imidazole group in a side chain is introduced into a major chain.

BEST MODE FOR CARRYING OUT THE INVENTION

Hereinafter, general aspects will be described in detail.

The enamel varnish composition for enamel wire includes, as a polymeric resin component, both of a polyamideimide resin (Hereinafter, referred to as the first resin), which is presented in the aforementioned Chemistry FIG. 1 and has an excellent wear resistance, and a polyamideimide resin (Hereinafter, referred to as the second resin) with an improved adhesivity to a conducting wire, and therefore the insulated coating layer manufactured thus shows an excellent adhesive force to the conducting wire, as well as the excellent wear resistance.

In a general aspect, the polyamideimide resin used as the first resin may be prepared by the reaction of an acid compound with diisocyanate, for example as shown in following Reaction Formula 1. The term "acid compound" is referred to as a compound(s) including carboxyl group-including compounds and their various derivatives:

wherein, the diisocyanate having a biphenyl group and different kinds of aromatic diisocyanate compounds are mixed and used as the diisocyanate. In this case, the diisocyanate compound having a biphenyl group preferably ranges from 10 to 90 mol %, more preferably from 30 to 70 mol %, most preferably from 40 to 60 mol %, based on the total mole of the used diisocyanate compound. If the diisocyanate compound having a biphenyl group has a content of less than 10 mol %, it has a slightly increased mechanical strength of the insulated coating, and if it exceeds a content of 90 mol %, the insulated coating tends to be easily brittle.

Here, a specific example of the diisocyanate compound having a biphenyl group includes biphenyl-4,4'-diisocyanate, biphenyl-3,3'-diisocyanate, biphenyl-3,4'-diisocyanate, 3,3'-chlorobiphenyl-4,4'-diisocyanate, 2,2'-chlorobiphenyl-4,4'diisocyanate, 3,3'-dibromobiphenyl-4,4'-diisocyanate, 2,2'-dibromobiphenyl-4,4'-diisocyanate, 3,3'-dimethylbiphenyl-4,4'-diisocyanate, 2,2'-dimethylbiphenyl-4,4'-diisocyanate, 2,3'-dimethylbiphenyl-4,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, 2,3'-dimethoxybiphenyl-4,4'-diisocyanate, 3,3'-diethoxybiphenyl-4,4'-diisocyanate, 2,2'-diethoxybiphenyl-4,4'-diisocyanate, 2,3'-diethoxybiphenyl-4,4'-diisocyanate, etc., and they may be used alone or in mixtures thereof, but not limited thereto.

Meanwhile, the biphenyl group-free aromatic diisocyanate compound includes, for example, diphenylmethane-4,4'-diisocyanate, diphenylmethane-3,3'-diisocyanate, diphenylmethane-3,4'-diisocyanate, diphenylether-4,4'-diisocyanate, benzophenone-4,4'-diisocyanate, diphenylsulfone-4,4'-diisocyanate, tolylene-2,4-diisocyanate, tolylene-2,6-diisocyanate, m-xylene diisocyanate and p-xylenediisocyanate, etc., and they may be used alone or in mixtures thereof, but not limited thereto.

In one general aspect, an acid compound includes tribasic acid, tribasic anhydride, tribasic derivatives, etc., and they may be used as the aromatic compound. An example of the acid compound includes trimelitic acid, trimelitic dianhydride, trimelityl chloride or derivatives of the trimelitic acid, and they may be used alone or in mixtures thereof, but not limited thereto.

Also, tetracarboxylic acid, tetracarboxylic anhydride and its derivatives, dibasic acid, etc. may be additionally used as the acid compound, and they may improve physical properties of the polyamideimide resin by forming the more amide or imide bonds in their polymeric major chains. An example of the additional acid compound includes pyromelitic dianhydride, biphenyltetracarboxylic dianhydride, benzophenonetetracarboxylic dianhydride, diphenylsulfonetetracarboxylic dianhydride, terephthalic acid, isophthalic acid, sulfoterephthalic acid, dicitric acid, 2,5-thiophenecarboxylic acid, 4,5-phenanthrenecarboxylic acid, benzophenone-4,4'-dicarboxylic acid, phthaldiimidecarboxylic acid, biphenyldicarboxylic acid, 2,6-naphthalenedicarboxylic acid, diphenylsulfone-4,4'-dicarboxylic acid, adipic acid, etc., and they may be used alone or in mixtures thereof.

The number-average molecular weight of such a first resin preferably ranges from 10,000 to 70,000, considering the compatibility with a second resin described later, the wear resistance, the workablility, etc. of the enamel wire.

Meanwhile, a triazine ring having an imidazole group in a side chain is introduced into a major chain in the second resin mixed with the first resin as described above. Unlike the conventional polyamideimide resin, general aspects show an improved adhesive force to the conducting wire since such a polar group is introduced into the second resin.

An example of such a second resin is polyamideimide resin, present in following Chemistry FIG. 2.

$R_9$ is selected from the group consisting of compounds presented in following Chemistry FIG. 3;

ChemistryFigure 3

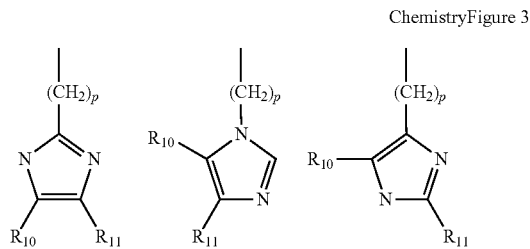

In the Chemistry FIG. 3, p is an integer of 0 to 4, $R_{10}$ and $R_{11}$ each is independently hydrogen, methyl, ethyl group.

Chemistry Figure 2

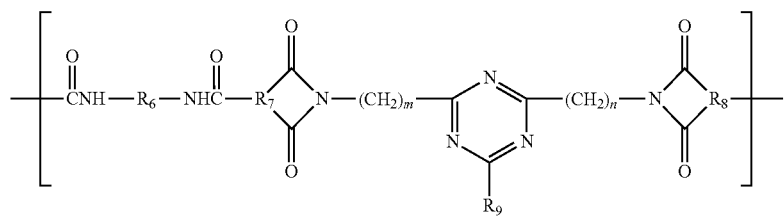

In the Chemistry FIG. 2, m and n each is independently an integer of 0 to 2, $R_6$ is a residue derived from at least one aromatic diisocyanate selected from the group consisting of diphenylmethane-4,4'-diisocyanate, diphenylmethane-3,3'-diisocyanate, diphenylmethane-3,4'-diisocyanate, diphenylether-4,4'-diisocyanate, benzophenone-4,4'-diisocyanate, diphenylsulfone-4,4'-diisocyanate, tolylene-2,4-diisocyanate, tolylene-2,6-diisocyanate, m-xylene diisocyanate and p-xylenediisocyanate, $R_7$ and $R_8$ each is independently a residue derived from at least one acid compound selected from the group consisting of trimelitic acid, trimelitic dianhydride, trimelityl chloride or derivatives of the trimelitic acid, Such a second resin may be synthesized, for example using a following mechanism. First, a triazine compound including two amine groups and imidazolyl groups in a side chain reacts with a tribasic acid compound such as trimelitic dianhydride at a molar ratio of 1:2 to prepare an imidized dicarboxylic acid compound, which includes an imide group and carboxyl groups in both of its terminal ends. Then, a second polyamideimide resin, in which a triazine ring including an imidazolyl group as the side chain is introduced into a major chain, may be obtained by reacting a diisocyanate compound with the resultant imidized dicarboxyl compound. One example of such synthesis may be presented in following Reaction Formula 2.

Reaction Formula 2

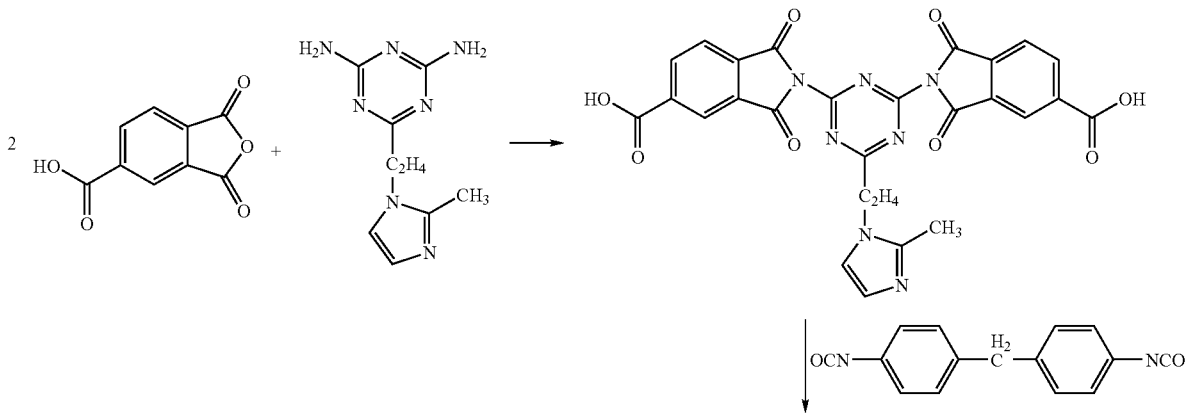

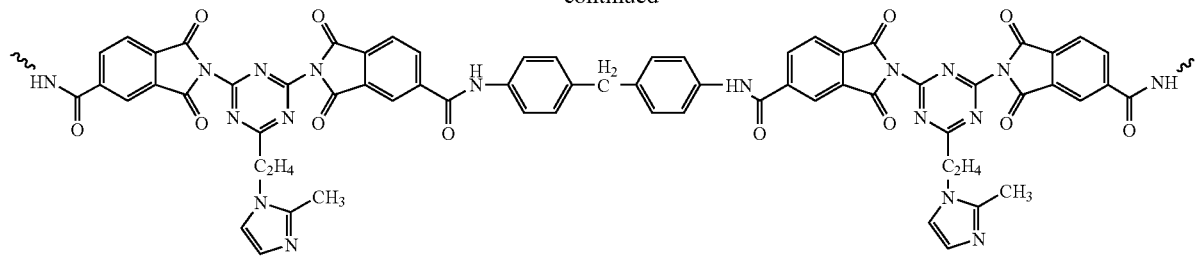

Referring to Reaction Formula 2, 1 mol of 2,4-diamino-6-[2'-methylimidazolyl-1')]-ethyl-s-triazine may react with 2 mol of trimelitic dianhydride to synthesize imidized dicarboxylic acid, and then the desired second resin may be polymerized by adding diphenylmethane-4,4'-diisocyanate to the imidized dicarboxylic acid.

The diisocyanate compound and the acid compound, which may be used to synthesize such a second resin, are identical to the compound as described above in the first resin.

Also, the triazine compound having the two amine groups and imidazolyl groups in the side chain includes, for example 2,4-diamino-6-[2-(2-methyl-1-imidazolyl)ethyl]-s-triazine, 2,4-diamino-6-[2-(2-ethyl-1-imidazolyl)ethyl]-s-triazine, 2,4-diamino-6-[2-(2-imidazolyl)ethyl]-s-triazine, 2,4-diamino-6-[2-(1-imidazolyl)ethyl]-s-triazine, 2,4-diamino-6-(2-ethyl-4-imidazolyl)-s-triazine, 2,4-diamino-6-[2-(4-methyl-1-imidazolyl)ethyl]-s-triazine, 2,4-diamino-6-(2-ethyl-5-methyl-4-imidazolyl)-s-triazine, 2,4-diamino-6-(4-ethyl-2-methyl-1-imidazolyl)-s-triazine, 2,4-diamino-6-[3-(2-methyl-1-imidazolyl)propyl]-s-triazine, 2,4-diamino-6-[4-(2-imidazolyl)butyl]-s-triazine, 2,4-diamino-6-[2-(2-methyl-1-imidazolyl)propyl]-s-triazine, 2,4-diamino-6-[1-methyl-2-(2-methyl-1-imidazolyl)ethyl]-s-triazine, 2,4-diamino-6-[2-(2,5-dimethyl-1-imidazolyl)ethyl]-s-triazine, 2,4-diamino-6-[2-(2,4-dimethyl-1-imidazolyl)ethyl]-s-triazine, 2,4-diamino-6-[2-(2-ethyl-4-methyl-1-imidazolyl)ethyl]-s-triazine, etc. and they may be used alone or in mixtures thereof, but not limited thereto.

General aspects of the enamel varnish composition for enamel wire include both of the first resin and the second resin as described above. The composition may have both of a required wear resistance and a desired adhesive force by adjusting a mixing ratio of the first resin and the second resin. At this point, the second resin preferably has a content of 1 to 20% by weight, based on the total weight of the resin included in the composition.

Such number-average molecular weight of the second polyamideimide resin preferably ranges from 10,000 to 70,000, considering the adhesivity to the conducting wire, the workablility, etc.

The organic solvent is not particularly limited as the polar solvent if it may be used in the enamel varnish composition for enamel wire. For example, NMP, DMF, DMAc, DMSO, etc. may be used alone or in mixtures thereof, and aromatic hydrocarbon may be used as the diluent, but they are not limited thereto.

As described above, general aspects of the enamel varnish composition for enamel wire include the polyamideimide resin showing an excellent wear resistance and an excellent adhesive force to the conducting wire, and therefore, for the enamel wire having a conducting wire; and multi-layered insulated coating layers formed in the outside of the conducting wire, it may be useful to be used as the innermost insulated coating layer directly connected to the conducting wire. Especially, general aspects of the enamel varnish composition for enamel wire may satisfy the wear resistance and the adhesivity simultaneously without forming an additional bonding layer.

As described above, general aspects of the enamel wire having an example of the composition described herein as the innermost insulated coating layer may improve the adhesive force of the polyamideimide-based insulated coating layer to the conducting wire, compared to the conventional composition with the poor adhesive force, and therefore may further improve physical properties of the enamel wire such as wear resistance, flexibility, etc. Also, its manufacturing process may be more simply carried out since the undercoating process for forming the additional bonding layer is not required.

General aspects of the enamel wire further include a lubricant insulated coating layer including polyamideimide resin in which a lubricant is present as the outermost layer of the insulated coating layer.

Such a lubricant insulated coating layer is an insulated coating layer in which lubricating materials such as low molecular weight polyethylene wax or polyester wax, etc. are included in the conventional polyamideimide resin, which is used for the insulated coating layer of the enamel wire. The lubricant insulated coating layer may improve a winding property of the enamel wire when the enamel wire is wound, and it may be also easily inserted into a narrow space, and therefore it may reduce damage of the insulated coating layer upon its use since it has a lubricating property in its surface.

An example of the lubricant insulated coating layer used may be synthesized using the methods known to those skilled in the art, and HI-406-SL (manufactured by the company Hitachi Chemical), etc. may be commercially available.

MODE FOR THE INVENTION

Hereinafter, general aspects will be described in detail. Therefore, the description proposed herein is an example for the purpose of illustrations only, and is not intended to limit the scope of any aspect. It should be understood that other equivalents and modifications could be made thereto without departing from the spirit and scope of the invention. However, it should be understood that general aspects could be described more specifically to those skilled in the art from this detailed description.

Synthetic Example 1

Synthesis of the First Polyamideimide Resin 686 parts by weight of N-methyl pyrrolidone well dried at a room temperature was added to a 4-necked flask equipped with a stirrer and a condenser, and 175.2 parts by weight of trimelitic dianhydride was added and stirred. Then, 62.5 parts by weight of diphenylmethane-4,4'-diisocyanate (MDI) and 198 parts by weight of 3,3'-dimethylbiphenyl-4,4'-diisocyanate (TODI) were added, warmed at 80° C. for 3 hours, followed by to 140° C. over 3 hours, and reacted at 140° C. for 2 hours to yield a polyamideimide resin solution. The solvents naphtha and xylene were added to the polyamideimide resin solution to yield a polyamideimide coating pigment having 25% by weight of a polymeric resin component.

Synthetic Example 2

Synthesis of the Second Polyamideimide Resin 675 parts by weight of N-methyl pyrrolidone well dried at a room temperature was added to a 4-necked flask equipped with a stirrer and a condenser, followed by 192.12 parts by weight of trimelitic dianhydride, and 109.65 parts by weight of 2,4-diamino-6-[2'-methylimidazolyl-(1')]-ethyl-s-triazine was added while stirring, warmed to 260° C. over 8 hours, and then 18 parts by weight of water was removed out as a by-product to yield an acid compound having an imide group. Then, the acid was cooled to a room temperature again, 112.5 parts by weight of diphenylmethane-4,4'-diisocyanate (MDI) was added thereto, warmed at 80° C. for 3 hours, followed by to 140° C. over 3 hours, and then heated at 140° C. for 3 hours to yield a polyamideimide resin solution. The solvents naphtha and xylene were added to the polyamideimide resin solution to yield a polyamideimide coating pigment having 20% by weight of a polymeric resin component.

Synthetic Example 3

510 parts by weight of N-methyl pyrrolidone well dried at a room temperature was added to a 4-necked flask equipped with a stirrer and a condenser, and 201 parts by weight of trimelitic dianhydride was added and stirred. Then, 250 parts by weight of diphenylmethane-4,4'-diisocyanate (MDI) was added, warmed at 80° C. for 3 hours, followed by to 140° C. over 3 hours, and then reacted at 140° C. for 2 hours to yield a polyamideimide resin solution. The solvents naphtha and xylene were added to the polyamideimide resin solution to yield a wear-resistance polyamideimide coating pigment having 27% by weight of a polymeric resin component.

EXAMPLES 1 to 5

The polyamideimide coating pigments obtained previously was used according to the content described in following Table 1 to manufacture an insulated wire composed of two kinds of insulated coating layers, wherein the mixed composition of polyamideimide pigments prepared in Synthetic examples 1 and 2 was used as the first layer contacted with a copper wire, and HI-406-SL commercially available from the company Hitachi Chemical was used as the second layer formed in an upper surface of the first layer. The used copper wire has a diameter of 1.495 mm, the insulated wire, in which an outer surface of the copper wire is coated using an enamel coater from the company SICME, has a diameter of 1.573 mm, and the insulated coating layer has a total thickness of 39 μm

TABLE 1

| Coating Layer | Coating Pigment used | Example | | | | |
|---|---|---|---|---|---|---|
| | | 1 | 2 | 3 | 4 | 5 |
| First Layer (Inner) | Synthetic example 1 | 100 | 100 | 100 | 100 | 100 |
| | Synthetic example 2 | 5 | 10 | 15 | 20 | 30 |
| Third Layer(Outer) | HI-406-SL | HI-406-SL | HI-406-SL | HI-406-SL | HI-406-SL | HI-406-SL |

Comparative Examples 1 to 4

The insulated wires composed of two or three kinds of the insulated coating layers were manufactured according to the content listed in following Table 2. The used copper wire has a diameter of 1.495 mm, the insulated wire, in which an outer surface of the copper wire is coated using an enamel coater from the company SICME, has a diameter of 1.573 mm, and the insulated coating layer has a total thickness of 39 μm.

TABLE 2

| Coating Layer | Coating Pigment used | Comparative example | | | |
|---|---|---|---|---|---|
| | | 1 | 2 | 3 | 4 |
| First Layer (Inner) | Triethylamine | 1 | 2 | — | — |
| | Synthetic example 2 | — | — | — | 5 |
| | Synthetic example 3 | 100 | 100 | — | 100 |
| Second Layer (Intermediate) | Synthetic example 1 | Synthetic example 1 | Synthetic example 1 | Synthetic example 1 | Synthetic example 1 |
| Third Layer(Outer) | HI-406-SL | HI-406-SL | HI-406-SL | HI-406-SL | HI-406-SL |

The physical properties such as coating thickness, unidirectional wear resistance, adhesivity and flexibility were measured for the enamel wires prepared in the previous Examples and Comparative examples.

Adhesivity

Each enamel wire prepared in the previous Examples and Comparative examples was prepared at a length of 100 cm, and the resultant insulated wires were tensioned and broken at a speed of 20 cm/sec. Then, broken sections were observed, and then a floating distance (mm) between a conductor surface and a peeled insulated coating was measured. The result is listed in following Table 3.

Unidirectional Wear Resistance

Wear resistance was measured according to the method as described in KSC-3105. The result is listed in following Table 3.

Flexibility

A minimum diameter of the insulated wire which is not cracked and peeled off when the insulated wire made of each material was bent, is set to d (mm). The flexibility of each insulated wire was measured and described as the multiple of d (mm). The result is listed in following Table 3.

TABLE 3

| Content | Example | | | | | Comparative example | | | |
|---|---|---|---|---|---|---|---|---|---|
| | 1 | 2 | 3 | 4 | 5 | 1 | 2 | 3 | 4 |
| Thickness of Coating Layer(Inner/Intermediate/Outer) (μm) | 35.75// 3.25 | 35.75// 3.25 | 35.75// 3.25 | 35.75// 3.25 | 35.75/ 3.25 | 9.75/ 26.0/ 3.25 | 9.75/ 26.0/ 3.25 | 35.75// 3.25 | 9.75/ 26.0/ 3.25 |
| Unidirectional Wear Resistance (kgf) | 2,600 | 2,630 | 2,300 | 2,200 | 1,900 | 1,900 | 2,100 | 2,200 | 2,600 |
| Adhesivity (mm) | 3 | 2 | 10 | 22 | 30 | 33 | 30 | 32 | 3 |
| Flexibility | 1d | 1d | 2d | 2d | 2d | 2d | 2d | 4d | 1d |

Referring to Table 3, it was revealed that the enamel wire prepared in the Examples shows the excellent properties such as the adhesivity, the unidirectional wear resistance and the flexibility, compared to the enamel wire devoid of the additional bonding layer as described in Comparative example 3, as well as to the enamel wire having three kinds of the insulated coating layers undercoated with the triethylamine-including polyamideimide resin as described in Comparative examples 1 and 2. Also, it was found that although the additional bonding layer was not formed in the enamel wire of Example 1, the enamel wire shows the same physical properties as the enamel wire of Comparative example 4 which a mixture of the second resin prepared in Synthetic example 2 and the conventional polyamideimide resin prepared in Synthetic example 1 was undercoated as the bonding layer, and then the second layer and the third layer were formed on the bonding layer.

INDUSTRIAL APPLICABILITY

As described above, general aspects of the enamel varnish composition for enamel wire show an improved adhesivity and an excellent wear resistance since it includes a polyamideimide resin in which a triazine ring having an imidazolyl group as a side chain is introduced into a major chain. As a result, general aspects of the enamel wire using the enamel varnish composition for enamel wire show the excellent adhesivity of to the conducting wire without forming the additional bonding layer, as well as the excellent physical properties such as the wear resistance, the flexibility, etc.

The invention claimed is:

1. An adhesive polyamideimide-based enamel varnish composition for enamel wire, the varnish composition having a polymeric resin component in organic solvent, the polymeric resin component comprising:

a first polyamideimide resin, presented in Chemistry FIG. 1:

<Chemistry Figure 1>

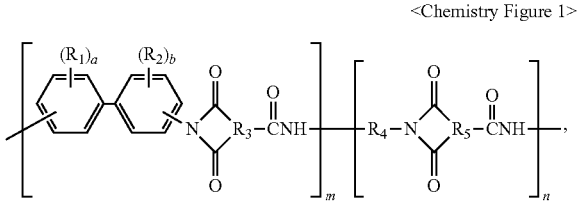

where a ratio of m:n ranges from 0.1:0.9 to 0.9:0.1; and a second polyamideimide resin in which a triazine ring having an imidazole group in a side chain is introduced into a major chain, the second polyamideimide resin being 1 to 20% by weight of a total weight of resin in the composition, wherein:

$R_1$ and $R_2$ each are independently selected from the group consisting of an alkyl group, an alkoxy group, and halogen, the alkyl group and the alkoxy group having 1 to 4 carbon atoms, a and b each being an integer of 0 to 4;

$R_3$ and $R_5$ each are independently a residue derived from at least one acid compound selected from the group consisting of trimelitic acid, trimelitic di-anhydride, trimelityl chloride, and trimelitic acid derivatives; and $R_4$ is a residue derived from at least one aromatic diisocyanate compound selected from the group consisting of diphenylmethane-4,4'-diisocyanate, diphenylmethane-3,3'-diisocyanate, diphenylmethane-3,4'-diisocyanate, diphenylether-4,4'-diisocyanate, benzophenone-4,4'diisocyanate, diphenylsulfone-4,4'-diisocyanate, tolylene-2,4-diisocyanate, tolylene-2,6-diisocyanate, m-xylene diisocyanate, and p-xylenediisocyanate.

2. The adhesive polyamideimide-based enamel varnish composition for enamel wire according to the claim 1, wherein:

the second polyamideimide resin is polyamideimide, presented in Chemistry FIG. 2:

<Chemistry Figure 2>

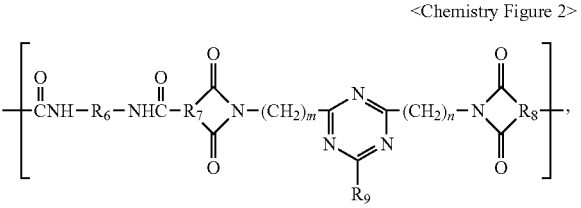

where m and n each are independently an integer of 0 to 2;

R$_6$ is a residue derived from at least one aromatic diisocyanate selected from the group consisting of diphenylmethane-4,4'-diisocyanate, diphenylmethane-3,3'-diisocyanate, diphenylmethane-3,4'-diisocyanate, diphenylether-4,4'-diisocyanate, benzophenone-4,4'-diisocyanate, diphenylsulfone-4,4'-diisocyanate, tolylene-2,4-diisocyanate, tolylene-2,6-diisocyanate, m-xylene diisocyanate, and p-xylenediisocyanate;

R$_7$ and R$_8$ each are independently a residue derived from at least one acid compound selected from the group consisting of trimelitic acid, trimelitic di-anhydride, trimelityl chloride, or derivatives of the trimelitic acid; and R$_9$ is selected from the group consisting of compounds presented in Chemistry FIG. 3:

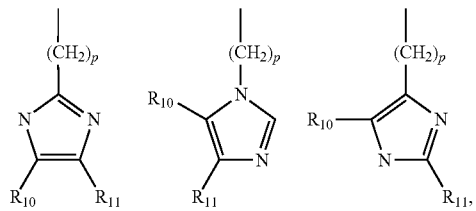

<Chemistry Figure 3> where p is an integer of 0 to 4, and R$_{10}$ and R$_{11}$ each are independently hydrogen, methyl, and ethyl group.

3. An enamel wire having a conducting wire and a plurality of insulated coating layers formed in an outside of the conducting wire, the enamel wire comprising:

an adhesive coating layer formed of mixed resin as an innermost insulated coating layer directly connected to an outer surface of the conducting wire, the adhesive coating layer comprising:

a first polyamideimide resin, presented in Chemistry FIG. 1:

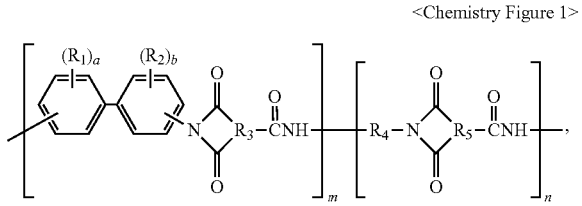

<Chemistry Figure 1> where a ratio of m:n ranges from 0.1:0.9 to 0.9:0.1; and a second polyamideimide resin in which a triazine ring having an imidazole group in a side chain is introduced into a major chain, the second polyamideimide resin being 1 to 20% by weight of a total weight of resin included in the innermost insulated coating layer, wherein:

R$_1$ and R$_2$ each are independently selected from the group consisting of an alkyl group, an alkoxy group and halogen, the alkyl group and the alkoxy group having 1 to 4 carbon atoms, a and b each being an integer of 0 to 4;

R$_3$ and R$_5$ each are independently a residue derived from at least one acid compound selected from the group consisting of trimelitic acid, trimelitic di-anhydride, trimelityl chloride, and derivatives of the trimelitic acid; and R$_4$ is a residue derived from at least one aromatic diisocyanate compound selected from the group consisting of diphenylmethane-4,4'-diisocyanate, diphenylmethane-3,3'-diisocyanate, diphenylmethane-3,4'-diisocyanate, diphenylether-4,4'-diisocyanate, benzophenone-4,4'-diisocyanate, diphenylsulfone-4,4'-diisocyanate, tolylene-2,4-diisocyanate, tolylene-2,6-diisocyanate, m-xylene diisocyanate, and p-xylenediisocyanate.

4. The enamel wire according to the claim 3, wherein:

the second polyamideimide resin is a polyamideimide resin presented in following Chemistry FIG. 2:

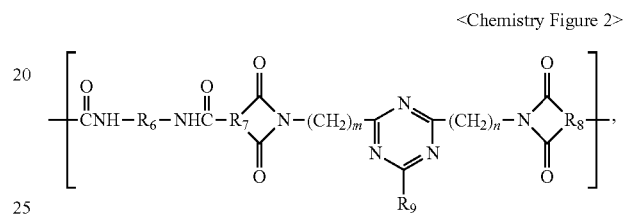

<Chemistry Figure 2> where m and n each are independently an integer of 0 to 2;

R$_6$ is a residue derived from at least one diisocyanate selected from the group consisting of diphenylmethane-4,4'-diisocyanate, diphenylmethane-3,3'-diisocyanate, diphenylmethane-3,4'-diisocyanate, diphenylether-4,4'-diisocyanate, benzophenone-4,4'-diisocyanate, diphenylsulfone-4,4'-diisocyanate, tolylene-2,4-diisocyanate, tolylene-2,6-diisocyanate, m-xylene diisocyanate, and p-xylenediisocyanate;

R$_7$ and R$_8$ each are independently a residue derived from at least one acid compound selected from the group consisting of trimelitic acid, trimelitic di-anhydride, trimelityl chloride and derivatives of the trimelitic acid; and R$_9$ is selected from the group consisting of compounds presented in Chemistry FIG. 3:

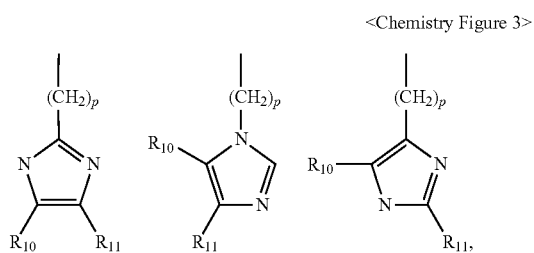

<Chemistry Figure 3> where p is an integer of 0 to 4, and R$_{10}$ and R$_{11}$ each are independently hydrogen, methyl, and ethyl group.

5. The enamel wire according to the claim 4, wherein an outermost layer of a plurality of the insulated coating layers is composed of a lubricant-including polyamideimide resin.

* * * * *